US009158220B2

(12) United States Patent
Kinouchi et al.

(10) Patent No.: US 9,158,220 B2
(45) Date of Patent: Oct. 13, 2015

(54) IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Satoshi Kinouchi, Tokyo-to (JP); Ryota Saeki, Shizuoka-ken (JP); Takaho Watanabe, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/187,946

(22) Filed: Feb. 24, 2014

(65) Prior Publication Data

US 2014/0240724 A1 Aug. 28, 2014

(30) Foreign Application Priority Data

Feb. 27, 2013 (JP) ................................ 2013-037433

(51) Int. Cl.
*G06K 15/00* (2006.01)
*G06F 3/12* (2006.01)
*G03G 15/00* (2006.01)

(52) U.S. Cl.
CPC ...................................... *G03G 15/00* (2013.01)

(58) Field of Classification Search
None
See application file for complete search history.

(56) References Cited

U.S. PATENT DOCUMENTS

2004/0175211 A1 9/2004 Sone et al.
2013/0164008 A1 6/2013 Shimmura et al.
2013/0222869 A1 * 8/2013 Maeda et al. ................ 358/504
2013/0267413 A1 * 10/2013 Oshiro .......................... 503/201

FOREIGN PATENT DOCUMENTS

JP 03-209286 9/1991
JP 07-049634 2/1995
JP 08-063059 3/1996
JP 2008-197586 8/2008
JP 2011-158598 8/2011
JP 2013037433 A * 2/2013

OTHER PUBLICATIONS

Japanese Office Action for Japanese Patent Application No. 2013-037433 mailed Jun. 3, 2014.
Office Action of Notification of Reason(s) for Refusal for Japanese Patent Application No. 2013-037433 Dated Feb. 3, 2015, 5 pages.

* cited by examiner

*Primary Examiner* — Marcus T Riley
(74) *Attorney, Agent, or Firm* — Amin, Turocy & Watson, LLP

(57) ABSTRACT

In accordance with one embodiment, an image forming apparatus comprises an image forming section configured to form a toner image on a printing recording medium, a fixing section configured to heat the printing recording medium printed with the toner image at a fixing temperature, a temperature control section configured to control the fixing section to a temperature above a color erasing temperature, a conveyance section configured to convey the printing recording medium or a color erasing recording medium to the fixing section, and a speed control section configured to control, according to a setting temperature of the fixing section, a speed ratio of a traveling speed of the fixing section to a conveyance speed of the conveyance section.

6 Claims, 6 Drawing Sheets

IMAGE FORMING APPARATUS

CROSS-REFERENCE TO RELATED APPLICATION

This application is based upon and claims the benefit of priority from Japanese Patent Application No. 2013-037433, filed Feb. 27, 2013, the entire contents of which are incorporated herein by reference.

FIELD

Embodiments described herein relate to an image forming apparatus which forms an image on a sheet, and further comprises a color erasing function of erasing an image formed on a sheet.

BACKGROUND

There exists an image forming apparatus which can change, when switching the conveyance speed of a sheet, the speed ratio of the conveyance speed of a sheet by a conveyance device conveying the sheet towards a fixing device to the conveyance speed of a sheet by the fixing device. On the other hand, in order to reuse a sheet, there exists an apparatus which heats and presses a sheet at a color erasing temperature higher than a fixing temperature using a fixing device to erase an image formed on the sheet. If the sheet is heated and pressed at a high color erasing temperature to erase an image, paper wrinkles occur easily on the sheet. Therefore, it is necessary to prevent the paper wrinkles occurring on the sheet when the sheet is heated and pressed at a high color erasing temperature.

DETAILED DESCRIPTION

In accordance with one embodiment, an image forming apparatus comprises an image forming section configured to form a toner image on a printing recording medium, a fixing section configured to heat the printing recording medium printed with the toner image at a fixing temperature, a temperature control section configured to control the fixing section to a temperature above a color erasing temperature, a conveyance section configured to convey the printing recording medium or a color erasing recording medium to the fixing section, and a speed control section configured to control, according to a setting temperature of the fixing section, a speed ratio of a traveling speed of the fixing section to a conveyance speed of the conveyance section.

Hereinafter, embodiments are described.

(A First Embodiment)

Figure 1:
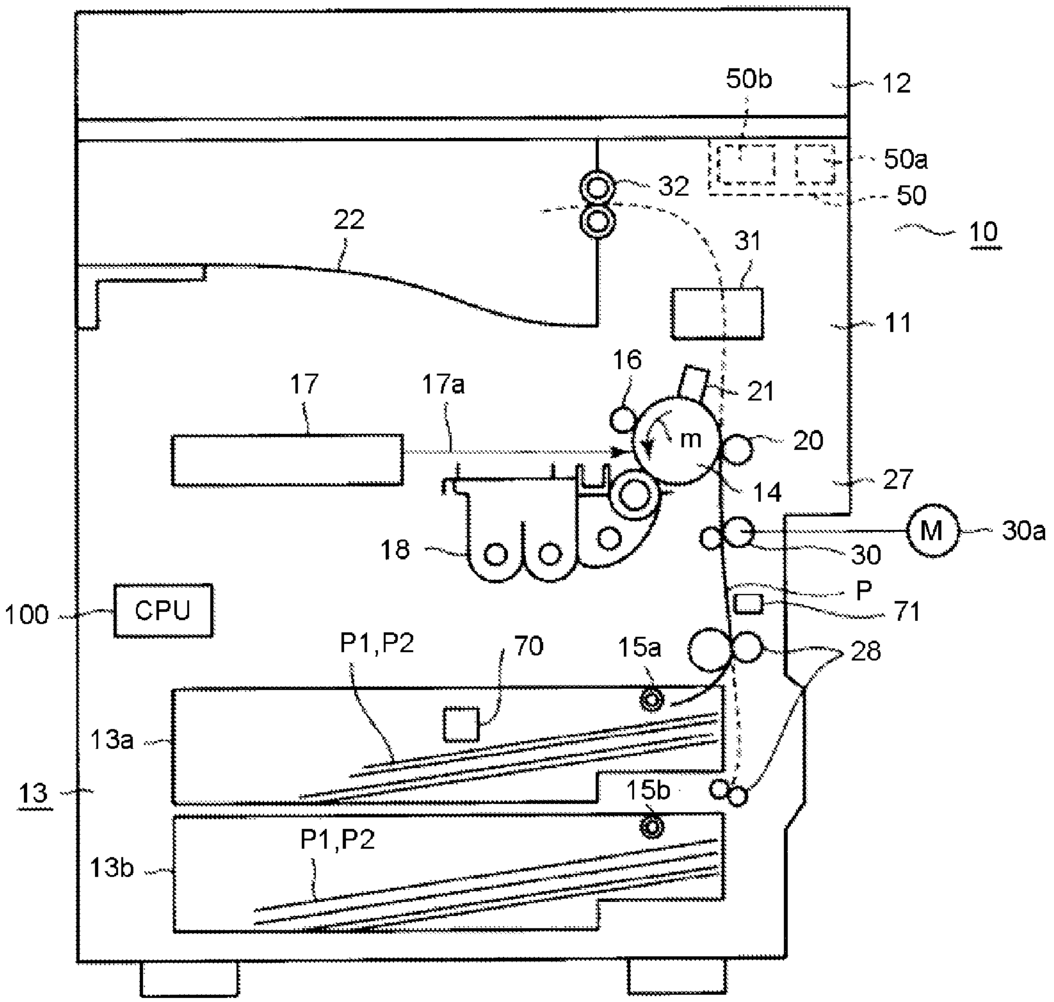
FIG. 1 is a schematic constitution diagram illustrating a MFP according to a first embodiment.

An image forming apparatus according to the first embodiment is described with reference to FIG. 1-FIG. 4. FIG. 1 illustrates a Multi-Function Peripheral (hereinafter referred to as MFP for short) 10 serving as one example of the image forming apparatus according to the first embodiment. The MFP 10 has a printing mode for forming an image on a printing sheet P1 serving as the printing recording medium and a color erasing mode for erasing an image formed on a color erasing sheet P2 serving as the color erasing recording medium. The MFP 10 comprises a printer section 11, a scanner section 12, a paper feed section 13 and a paper exit section 22.

The MFP 10 comprises a CPU 100 serving as a temperature control section and a speed control section for controlling the whole MFP 10. The MFP 10 comprises a display/operation panel 50 which is provided with an operation panel 50*a* and a touch panel type display 50*b*. The operation panel 50*a* receives an input from, for example, a user, the display 50*b* receives an input from, for example, a user, or carries out a display for the user.

The paper feed section 13 includes a first and a second paper feed cassette 13*a*, 13*b* which are provided with a paper feed roller 15*a*, 15*b*, respectively. The paper feed cassettes 13*a*, 13*b* store the printing sheet P1 or the color erasing sheet P2 (a sheet an image on which is to be erased). The printing sheet P1 may be a new sheet or a reusable sheet (a sheet an image on which is erased through a color erasing processing).

The MFP 10 comprises a temperature and humidity sensor 70 serving as an environment sensor detecting the environment conditions of the MFP 10 in, for example, the paper feed section 13. The MFP 10 further comprises a size sensor 71 detecting the size of the printing sheet P1 or the color erasing sheet P2 in, for example, the printer section 11. No specific limitation is given to the arrangement position of the temperature and humidity sensor 70 and the size sensor 71.

The printer section 11 includes a charger 16, a laser exposure device 17, a developing device 18 and a cleaner 21 around a photoconductive drum 14 rotating in a direction indicated by an arrow m. The charger 16 charges the photoconductive drum 14. The laser exposure device 17 irradiates the charged photoconductive drum 14 with a laser light 17*a* based on image data to form an electrostatic latent image on the photoconductive drum 14. The developing device 18 supplies a toner to the electrostatic latent image on the photoconductive drum 14. A transfer device 20 transfers the toner image formed on the photoconductive drum 14 to the printing sheet P1. The charger 16, the laser exposure device 17, the developing device 18 and the transfer device 20 constitute the image forming section.

The developing device 18 supplies the toner to the electrostatic latent image on the photoconductive drum 14 using, for example, a two-component developing agent serving as a mixture of a toner and a magnetic carrier. The toner may be a color-inerasable toner which cannot be erased by heating or a color erasable toner which can be erased if heated, for example, at a temperature above the color erasing temperature. The color erasable toner is prepared by adding a coloring agent, a color generation compound and a color developing agent to binder resin. If a fixed toner image formed using the color erasable toner is heated at a temperature above the color erasing temperature, the color generation compound and the color developing agent in the color erasable toner are dissociated, and therefore the color of the toner image is erased.

For example, the color erasable toner can be fixed on the sheet at a relatively low temperature, and can be erased at a temperature which is, for example, ten degrees centigrade higher than the fixing temperature.

The printer section 11 comprises a fixing device 31 serving as a fixing section between the photoconductive drum 14 and the paper exit section 22. The MFP 10 comprises a conveyance path 27 conveying the printing sheet P1 or the color erasing sheet P2 from the paper feed section 13 via the photoconductive drum 14 and the fixing device 31 towards the paper exit section 22.

The conveyance path 27 comprises a conveyance roller 28 and a register roller 30 serving as a conveyance section. A register roller motor 30*a* drives the register roller 30. When the MFP 10 is in a printing mode, the register roller 30 conveys the printing sheet P1 to a position between the photoconductive drum 14 and the transfer device 20 in synchronization with the toner image formed on the photoconductive drum 14. When the MFP 10 is in a color erasing mode, the register roller 30 conveys the color erasing sheet P2 to the fixing device 31. The conveyance path 27 further comprises a paper discharge roller 32 discharging the printing sheet P1 or the color erasing sheet P2 heated by the fixing device 31 to the paper exit section 22.

Figure 2:
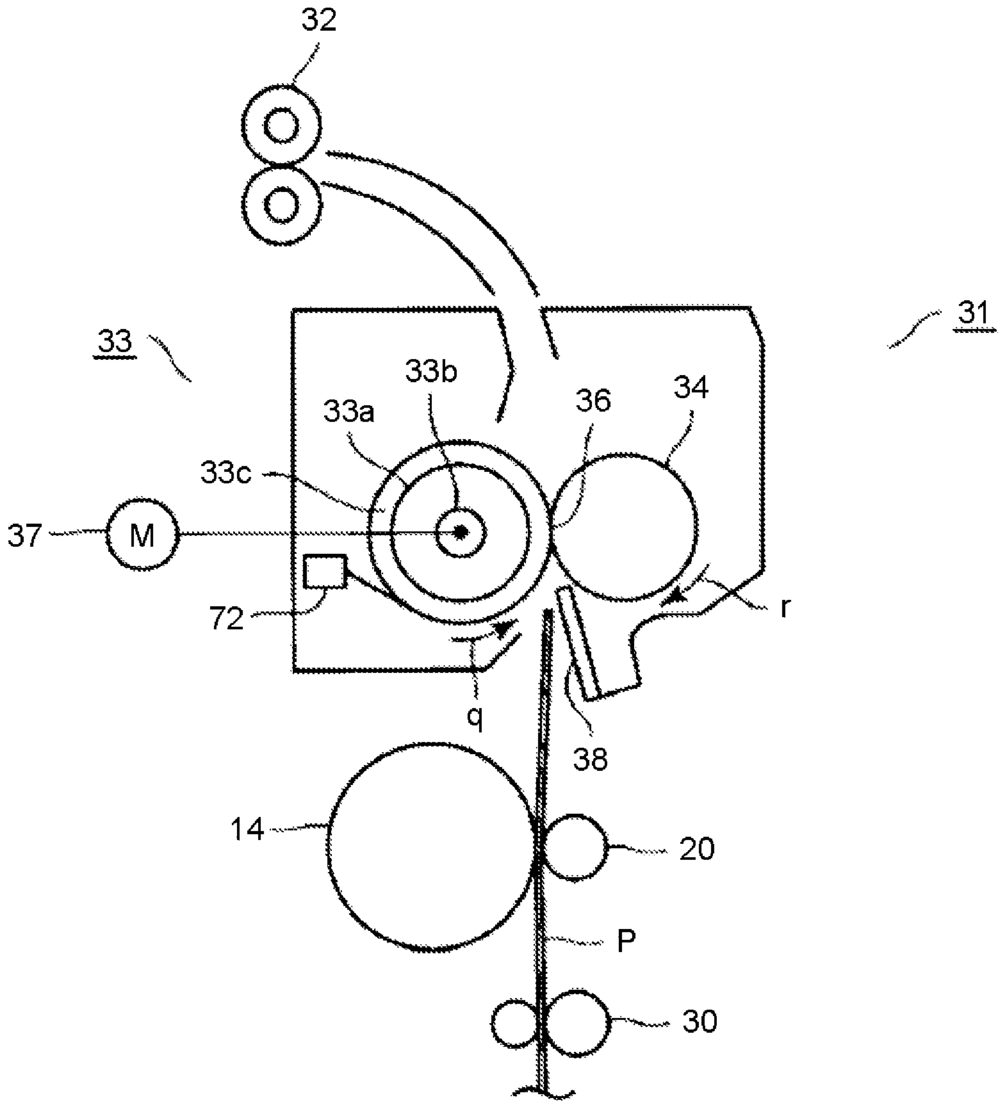
FIG. 2 is a schematic constitution diagram illustrating a fixing device according to the first embodiment.

As shown in FIG. 2, the fixing device 31 comprises, for example, a heat roller 33 and a press roller 34. The press roller 34 presses the heat roller 33 to form a nip 36 between the heat roller 33 and the press roller 34. The fixing device 31 comprises a thermistor 72 detecting the temperature of the heat roller 33 and an entrance guide 38 guiding the sheet P1, P2 conveyed from the direction of the register roller 30 to the nip 36.

The heat roller 33 comprises, for example, a heater lamp 33*b* inside a hollow core bar 33*a*. The heat roller 33 has a solid rubber layer 33*c* around the core bar 33*a*. The solid rubber layer 33*c* is formed thicker towards the end parts of the heat roller 33. The heat roller 33 is formed in a reverse crown shape, that is, the diameter of the heat roller 33 increases from the center part towards the end parts. By forming the heat roller 33 in a reverse crown shape, the sheet P1 or P2 in the nip 36 is stretched towards the direction of the end parts of the heat roller 33. By forming the heat roller 33 in a reverse crown shape, a deformation of the paper in the nip is prevented, and the occurrence of paper wrinkles of the sheet P1, P2 is prevented. The fixing device 31 may also use an IH heater to heat the heat roller 33.

The fixing device 31 drives the heat roller 33 to rotate in a direction indicated by an arrow q with, for example, the heat roller motor 37, and the press roller 34 is driven (by the rotation of the heat roller 33) to rotate in a direction indicated by an arrow r. The heat roller 33 and the press roller 34 may also be driven to rotate by respective motor.

The heat roller motor 37 changes the rotation speed of the heat roller 33 in response to the driving mode of the MFP 10. When the MFP 10 is in the color erasing mode, the heat roller motor 37 increases the rotation speed of the heat roller 33 such that the rotation speed is faster than that in the printing mode. Further, the fixing device 31 may also use, for example, a press belt instead of the press roller 34 to form a nip between the heat roller 33 and the belt.

The fixing device 31 clamps and conveys the printing sheet P1 or the color erasing sheet P2 in the nip 36. When the MFP 10 is in the printing mode, the fixing device 31 heats and presses the printing sheet P1 at the fixing temperature to fix the toner image formed on the printing sheet P1. When the MFP 10 is in the color erasing mode, the fixing device 31 heats and presses the color erasing sheet P2 to the color erasing temperature higher than the fixing temperature to erase the color erasable toner image formed on the color erasing sheet P2.

The CPU 100 variably controls the setting temperature of the fixing device 31 in response to the mode (printing mode, color erasing mode) of the MFP 10. The fixing device 31 turns on or turns off the heater lamp 33*b* to maintain the setting temperature. The CPU 100 variably controls the speed ratio of the conveyance speed of the sheet P1, P2 by the register roller 30 to the traveling speed of the sheet P1, P2 by the fixing device 31. The CPU 100 controls the speed ratio in response to the mode (printing mode, color erasing mode) of the MFP 10.

Figure 3:
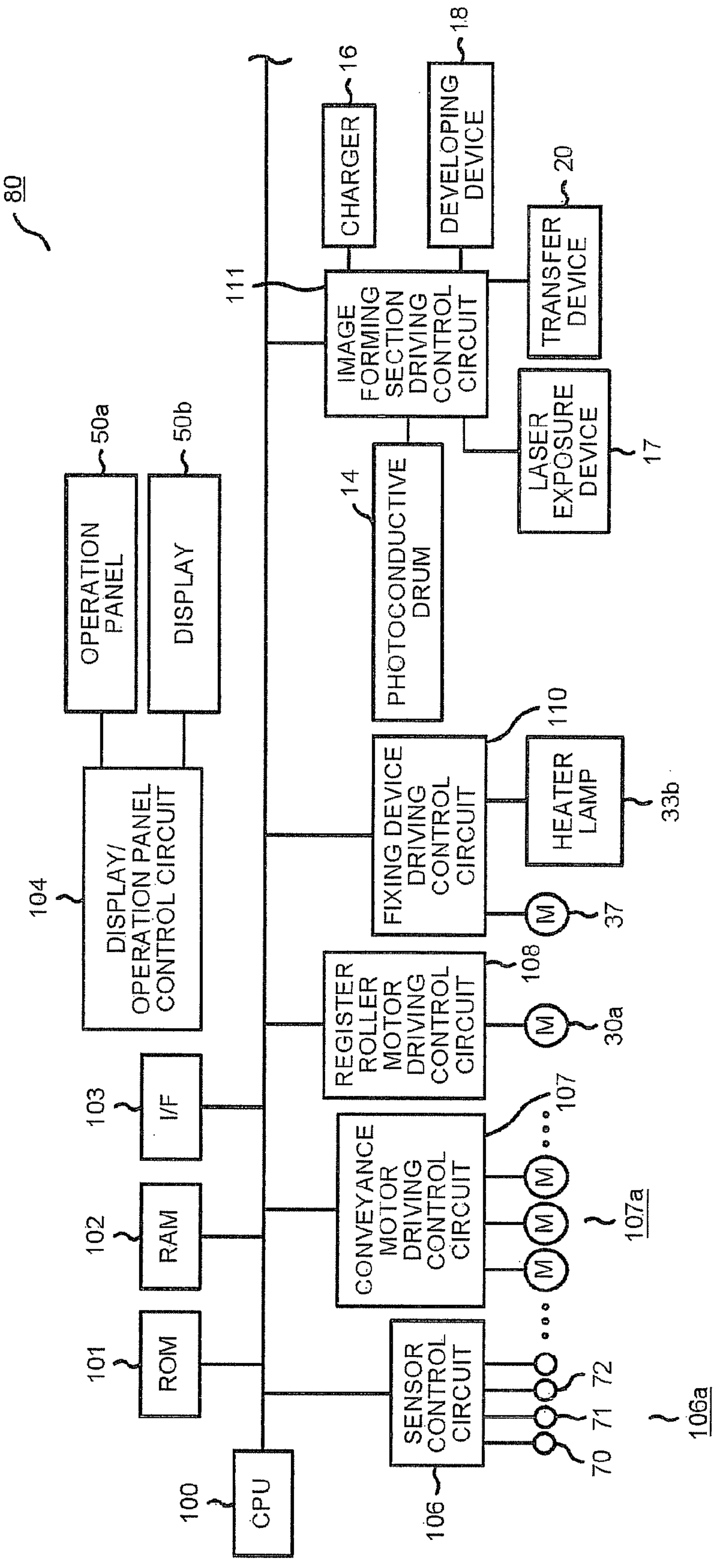
FIG. 3 is a schematic block diagram illustrating a control system of the MFP according to the first embodiment.

A control system 80 of the MFP 10 mainly controlling the register roller 30 and the fixing device 31 is described with reference to FIG. 3. The control system 80 comprises, for example, the CPU 100, a read only memory (ROM) 101, a random access memory (RAM) 102 and an interface (I/F) 103. The control system 80 further comprises a display/operation panel control circuit 104, a sensor control circuit 106, a conveyance motor driving control circuit 107, a register roller motor driving control circuit 108, a fixing device driving control circuit 110 and an image forming section driving control circuit 111.

The CPU 100 realizes an image forming processing function or an image erasing processing function by executing a program stored in the ROM 101 or the RAM 102. The ROM 101 stores control programs, control data and the like controlling the basic operations of the image forming processing or the image erasing processing. The RAM 102 is a working memory storing, for example, the data used for various determinations. The I/F 103 carries out communication with various devices such as a user terminal, a facsimile and the like.

The display/operation panel control circuit 104 controls the operation panel 50*a* and the display 50*b*. The sensor control circuit 106 controls various sensors 106*a* such as the temperature and humidity sensor 70, the size sensor 71, the thermistor 72 and the like.

The conveyance motor driving control circuit 107 controls a motor group 107*a* driving the paper feed rollers 15*a* and 15*b*, the conveyance roller 28, the paper discharge roller 32 and the like in the conveyance path 27. The register roller motor driving control circuit 108 controls the register roller motor 30*a*. The fixing device driving control circuit 110 controls the heater lamp 33*b* and the heat roller motor 37. The image forming section driving control circuit 111 controls the photoconductive drum 14, the charger 16, the laser exposure device 17, the developing device 18, the transfer device 20 and the like.

With these constitutions, the MFP 10, when in the printing mode, transfers the toner image on, for example, the printing sheet P1 fed from the paper feed section 13. The MFP 10 heats the printing sheet P1 at the fixing temperature using the fixing device 31, and discharges the sheet P1 fixed with the toner image to the paper exit section 22. The MFP 10, when in the color erasing mode, for example, heats the color erasing sheet P2 fed from the paper feed section 13 at the color erasing temperature using the fixing device 31 to erase the color erasable image formed on the color erasing sheet P2.

Next, the speed ratio of the conveyance speed of the sheet P1, P2 by the register roller 30 to the traveling speed of the sheet P1, P2 by the fixing device 31 is described. The sheet P1 or P2 is conveyed to the direction of the fixing device 31 by the register roller 30, and is guided into the nip 36 by the entrance guide 38. If the sheet P1, P2 flutters or deforms when arriving at the nip 36, the front end of the sheet P1, P2 cannot enter the nip 36 straightly sometimes. That the sheet P1, P2 enters the nip 36 at an angle is one reason of the occurrence of paper wrinkles on the sheet P1, P2 moving through the nip 36.

The higher the heating temperature of the fixing device 31 is, the higher the possibility of the occurrence of the paper wrinkles caused by the improper entrance of the sheet P1, P2 to the nip 36 is. If the heating temperature is high, the fixing device 31 sharply dehydrates the moisture contained in the sheet P1, P2, which may lead to deformation and paper wrinkles of the sheet P1, P2. For example, in a case where the degree of the improper entrance of the sheet P1, P2 to the nip 36 is almost the same, the paper wrinkles is more likely to occur in the color erasing mode in which the heating temperature is higher compared with the printing mode.

In a case where the entrance angle of the sheet P1, P2 to the nip 36 is small, the paper wrinkles of the sheet P1, P2 can be prevented by the crown shaped heat roller 33. The crown shaped heat roller 33 stretches the sheet P1, P2 towards the direction of end parts, thereby eliminating the bending of the sheet P1, P2 and preventing paper wrinkles. If the crown shaped heat roller 33 does not fully stretch the sheet P1, P2 towards the direction of end parts, and the sheet P1, P2 still bends, paper wrinkles may occur at the rear end of the sheet P1, P2.

The bending of the sheet P1, P2 is eliminated by conveying the sheet P1, P2 while slightly stretching the conveyed sheet P1, P2 in the nip 36. If the bending of the sheet P1, P2 is eliminated by conveying the sheet P1, P2 while slightly stretching the conveyed sheet P1, P2 in the nip 36, the paper wrinkles of the sheet P1, P2 can be prevented.

If the sheet P1, P2 is conveyed and slightly stretched in the nip 36 to eliminate the bending of the sheet P1, P2, the tension applied to the sheet P1, P2 is larger. When the MFP 10 is in the printing mode, the image formation may be affected if the tension applied to the printing sheet P1 becomes larger.

If the tension is applied to the printing sheet P1 to stretch the printing sheet P1 in the nip 36 in the printing mode, the rear end of the printing sheet P1 may bounce after the printing sheet P1 passes through the register roller 30. If the rear end of the printing sheet P1 bounces after being released from the pressure of the register roller 30, the printing sheet P1 at the transfer position vibrates, which may cause transfer blur. Therefore, it is preferred to make the traveling speed of the fixing device 31 the same with the conveyance speed of the register roller 30 so as to prevent the transfer blur caused by the bouncing of the rear end of the printing sheet P1. That is, it is preferred to make the speed ratio of the register roller 30 and the fixing device 31 closer to 1:1.

Figure 4:
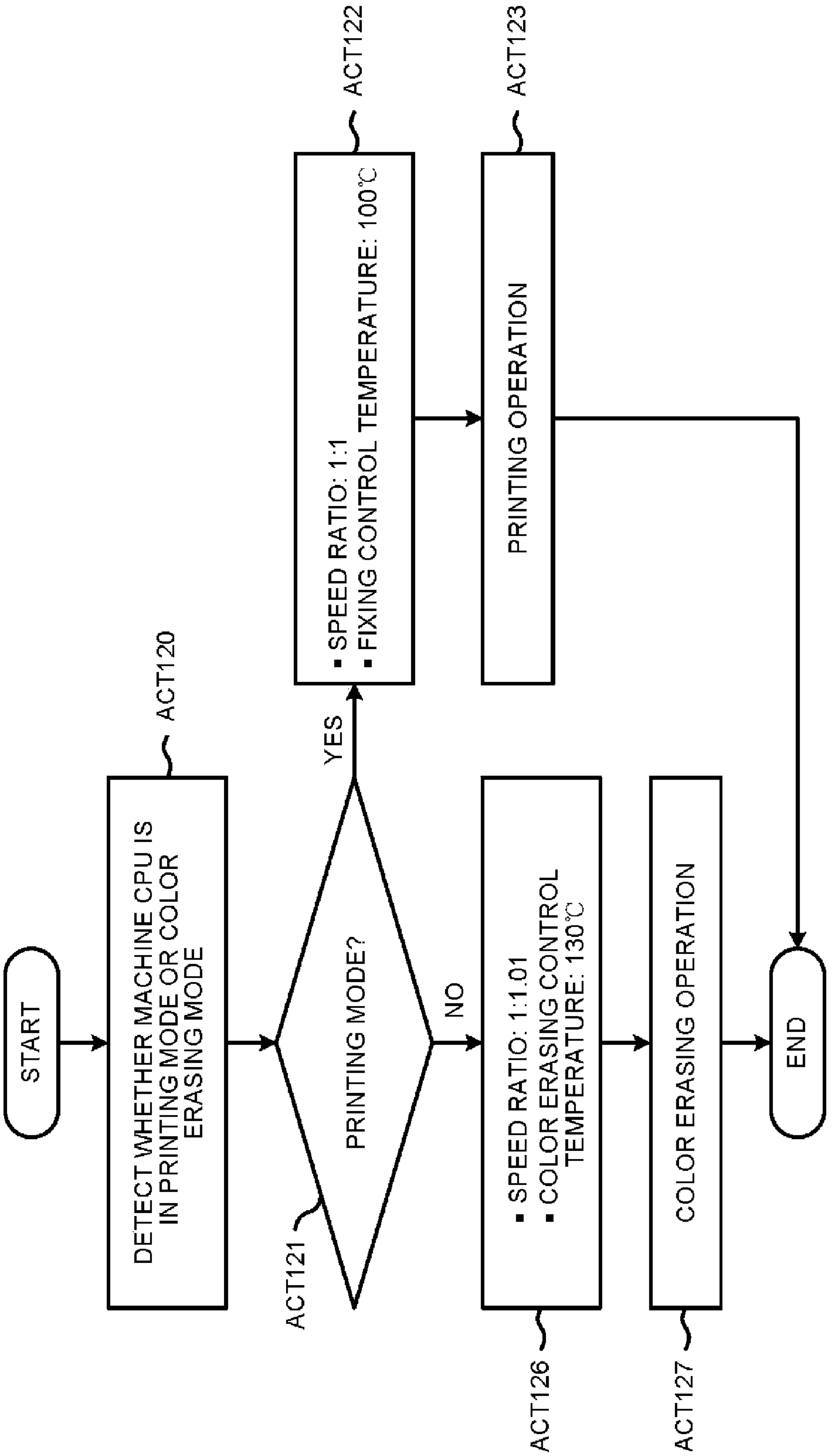
FIG. 4 is a flowchart illustrating a speed control of a sheet according to the first embodiment.

The speed control of the sheet P1, P2 of the MFP 10 for preventing the occurrence of paper wrinkles and obtaining a good-quality image without transfer blur is described with reference to the flowchart in FIG. 4.

The MFP 10 is initially set in such a manner that the operation mode after the power of the MFP 10 is turned on is, for example, the printing mode. In a case of desiring to switch the operation mode of the MFP 10 to the color erasing mode, for example, a user selects the color erasing mode on the display/operation panel 50. If the color erasing mode is selected from the display/operation panel 50, the CPU 100 sets the operation mode of the MFP 10 to the color erasing mode. The initial setting of the operation mode of the MFP 10 when the power is turned on is not limited.

After the MFP 10 is started, the CPU 100 detects the operation mode of the MFP 10 (ACT 120). The CPU 100, if determining that the operation mode is the printing mode (YES in ACT 121), proceeds to ACT 122.

In ACT 122, the CPU 100 controls the fixing device driving control circuit 110 to set the heating temperature of the heater lamp 33*b* to the fixing temperature (for example, 100 degrees centigrade). Further, the CPU 100 controls the register roller motor 30*a* using the register roller motor driving control circuit 108 and controls the heat roller motor 37 using the fixing device driving control circuit 110. The register roller motor 30*a* and the heat roller motor 37 are driven to make the conveyance speed of the printing sheet P1 by the register roller 30 the same with the traveling speed of the printing sheet P1 by the fixing device 31. The CPU 100 sets the speed ratio of the conveyance speed of the printing sheet P1 by the register roller 30 to the traveling speed of the printing sheet P1 by the fixing device 31 to (1:1), and then proceeds to ACT 123.

In ACT 123, the CPU 100 carries out printing operation on the printing sheet P1. The MFP 10 transfers the toner image on the printing sheet P1 conveyed to the position of the transfer device 20 by the register roller 30. The CPU 100 conveys the printing sheet P1 transferred with the toner image by clamping the printing sheet P1 in the nip 36 of the fixing device 31 of which the traveling speed is set to be equal to the conveyance speed of the register roller 30. The fixing device 31 heats the printing sheet P1 moving through the nip 36 at the fixing temperature to fix the toner image on the printing sheet P1.

As no tension is applied to the printing sheet P1 between the register roller 30 and the fixing device 31, the rear end of the printing sheet P1 won't bounce after passes through the register roller 30. Therefore, the printing sheet P1 won't vibrate and the image blur won't occur, thereby a toner image of good quality can be obtained using the MFP 10. The MFP 10 discharges, after the fixing processing is completed, the printing sheet 21 to the paper exit section 22 and then ends the printing operation.

If it is determined that the operation mode is the color erasing mode (NO in ACT 121), the CPU 100 proceeds to ACT 126. In ACT 126, the CPU 100 controls the fixing device driving control circuit 110 to set the heating temperature of the heater lamp 33*b* to the color erasing temperature (for example, 130 degrees centigrade). Further, the CPU 100 controls the register roller motor driving control circuit 108 to drive the register roller motor 30*a*. The CPU 100 controls the fixing device driving control circuit 110 to drive the heat roller motor 37.

That is, the CPU 100 drives and controls the register roller motor 30*a* and the heat roller motor 37 such that the traveling speed of the color erasing sheet P2 by the fixing device 31 is, for example, 1% faster than the conveyance speed of the color erasing sheet P2 by the register roller 30. The CPU 100 sets the speed ratio of the conveyance speed of the color erasing sheet P2 by the register roller 30 to the traveling speed of the color erasing sheet P2 by the fixing device 31 to (1:1.01), and then proceeds to ACT 127.

In ACT 127, the CPU 100 carries out color erasing operation on the color erasing sheet P2. The MFP 10 conveys the color erasing sheet P2 on which an image is formed with a color erasable toner to the fixing device 31 using the register roller 30. The MFP 10 conveys the color erasing sheet P2 by clamping the color erasing sheet P2 in the nip 36 of the fixing device 31 of which the traveling speed is set to be 1% faster than the conveyance speed of the register roller 30. The fixing device 31 heats the color erasing sheet P2 at the color erasing temperature to erase the toner image on the color erasing sheet P2. The MFP 10 discharges, after the color erasing processing is completed, the color erasing sheet P2 to the paper exit section 22, and then ends the color erasing operation.

In the color erasing mode, the speed ratio of the conveyance speed of the color erasing sheet P2 by the register roller 30 to the traveling speed of the color erasing sheet P2 by the fixing device 31 is set to (1:1.01), and the color erasing sheet P2 is slightly stretched. Tension is applied to the color erasing sheet P2 between the register roller 30 and the fixing device 31 to eliminate the bending of the color erasing sheet P2. Even though the color erasing sheet P2 is heated in the fixing device 31 at the color erasing temperature higher than the fixing temperature, the occurrence of paper wrinkles on the color erasing sheet P2 is prevented, thereby a good-quality reusable sheet can be obtained.

After this, every time the operation mode of the MFP 10 is set to the printing mode or the color erasing mode, the CPU 100 controls the setting temperature of the fixing device 31 and the speed ratio of the speed of the register roller 30 to the speed of the fixing device 31.

According to the first embodiment, when the MFP 10 is in the printing mode, the speed ratio of the conveyance speed of the printing sheet P1 by the register roller 30 to the traveling speed of the printing sheet P1 by the fixing device 31 is set to (1:1). The printing sheet P1 is not stretched between the register roller 30 and the fixing device 31, and no tension is applied to the printing sheet P1. The printing sheet P1 is prevented from vibrating when the printing sheet P1 passes through the register roller 30, thereby a good-quality toner image without image blur can be obtained.

When the MFP 10 is in the color erasing mode, the speed ratio of the conveyance speed of the color erasing sheet P2 by the register roller 30 to the traveling speed of the color erasing sheet P2 by the fixing device 31 is set to (1:1.01). The color erasing sheet P2 is slightly stretched between the register roller 30 and the fixing device 31, and tension is applied to the color erasing sheet P2 to eliminate the bending of the color erasing sheet P2. In the heating, pressing and color erasing operation carried out by the fixing device 31, the occurrence of the paper wrinkles on the color erasing sheet P2 is prevented even though the color erasing sheet P2 is heated at the color erasing temperature higher than the fixing temperature, thereby a good-quality reusable sheet without paper wrinkles can be obtained.

(A Second Embodiment)

Figure 5:
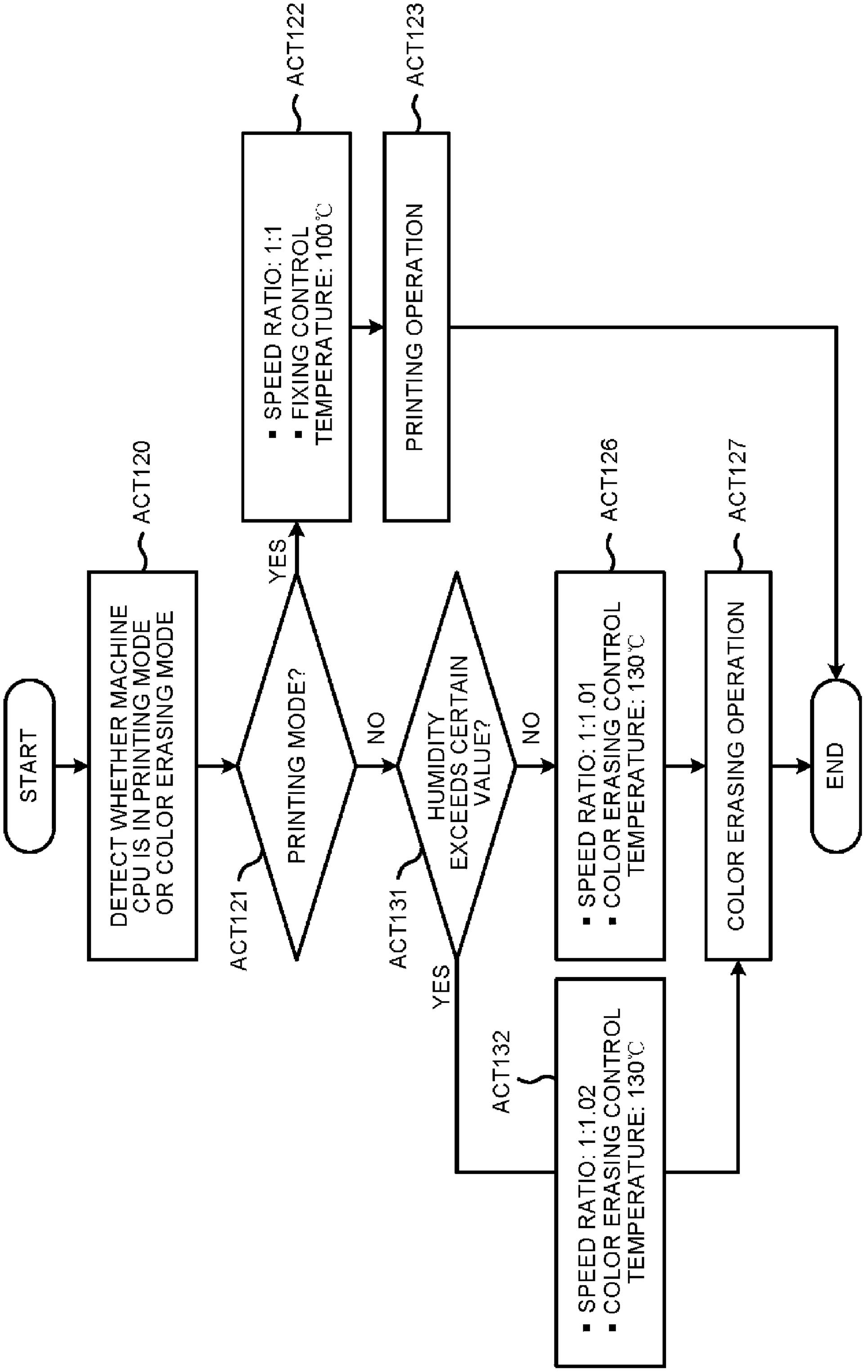
FIG. 5 is a flowchart illustrating a speed control of a sheet according to a second embodiment.

The image forming apparatus according to the second embodiment is described with reference to FIG. 5. The second embodiment controls the speed ratio of the conveyance speed of the conveyance section to the traveling speed of the fixing section in response to the environment conditions of the printing recording medium or the color erasing recording medium in the first embodiment. In the second embodiment, a component the same as that described in the first embodiment is marked with the same sign, and the detailed description thereof is omitted.

When the operation mode of the MFP 10 is the color erasing mode, the CPU 100 controls, further using the detection result of the temperature and humidity sensor 70, the speed ratio of the conveyance speed of the color erasing sheet P2 by the register roller 30 to the traveling speed of the color erasing sheet P2 by the fixing device 31. If the environmental humidity of the MFP 10 is high, the sheet P1, P2 has high moisture due to moisture absorption. The sheet P1, P2 having more moisture deforms easily. If the sheet P1, P2 enters the nip 36 of the fixing device 31 in a deformed state, paper wrinkles occur easily on the sheet P1, P2. The occurrence of paper wrinkles due to the high environmental humidity can also be prevented by conveying the sheet P1, P2 while slightly stretching the sheet P1, P2 in the nip 36.

The speed control of the sheet P1, P2 of the MFP 10 for preventing the occurrence of paper wrinkles even though in a case where the environmental humidity is high and obtaining a good-quality image without transfer blur is described with reference to the flowchart in FIG. 5.

If the operation mode of the MFP 10 is the printing mode after the MFP 10 is started, the CPU 100 carries out the same processing from ACT 120 to ACT 123 as in the first embodiment. If the operation mode of the MFP 10 is the printing mode, the CPU 100 sets the speed ratio of the conveyance speed of the printing sheet P1 by the register roller 30 to the traveling speed of the printing sheet P1 by the fixing device 31 to (1:1), and then carries out printing operation (ACT 123). The image blur due to the vibration of the printing sheet P1 during the printing mode is prevented, and a good-quality toner image is obtained.

If it is determined that the operation mode of the MFP 10 is the color erasing mode after the MFP 10 is started (NO in ACT 121), the CPU 100 proceeds to ACT 131. In ACT 131, if the humidity does not exceed a certain value (for example, relative humidity 70%) according to the detection result of the temperature and humidity sensor 70 (NO in ACT 131), the CPU 100 carries out the same processing from ACT 126 to ACT 127 as in the first embodiment. The CPU 100 controls the speed ratio of the conveyance speed of the color erasing sheet P2 by the register roller 30 to the traveling speed of the color erasing sheet P2 by the fixing device 31 to (1:1.01), and then carries out color erasing operation (ACT 127).

If the environmental humidity is high, and the humidity exceeds the certain value according to the detection result of the temperature and humidity sensor 70 (YES in ACT 131), the CPU 100 proceeds to ACT 132. In ACT 132, the CPU 100 controls the fixing device driving control circuit 110 to set the heating temperature of the heater lamp 33*b* to the color erasing temperature. Further, the CPU 100 controls the register roller motor driving control circuit 108 to drive the register roller motor 30*a*. The CPU 100 controls the fixing device driving control circuit 110 to drive the heat roller motor 37.

That is, the CPU 100 drives and controls the register roller motor 30*a* and the heat roller motor 37 such that the traveling speed of the color erasing sheet P2 by the fixing device 31 is, for example, 2% faster than the conveyance speed of the color erasing sheet P2 by the register roller 30. The CPU 100 sets the speed ratio of the conveyance speed of the color erasing sheet P2 by the register roller 30 to the traveling speed of the color erasing sheet P2 by the fixing device 31 to (1:1.02), and then proceeds to ACT 127.

In ACT 127, the CPU 100 conveys the color erasing sheet P2 on which an image is formed with a color erasable toner to the fixing device 31 using the register roller 30. The MFP 10 conveys the color erasing sheet P2 by clamping the color erasing sheet P2 in the nip 36 of the fixing device 31 of which the traveling speed is set to be 2% faster than the conveyance speed of the register roller 30. The fixing device 31 heats the color erasing sheet P2 at the color erasing temperature to erase the toner image on the color erasing sheet P2. The MFP 10 discharges, after the color erasing processing is completed, the color erasing sheet P2 to the paper exit section 22, and then ends the color erasing operation.

In the color erasing mode, if the environmental humidity of the MFP 10 is high, the speed ratio of the conveyance speed of the color erasing sheet P2 by the register roller 30 to the traveling speed of the color erasing sheet P2 by the fixing device 31 is set to (1:1.02), and the color erasing sheet P2 is slightly stretched. High tension is applied to the color erasing sheet P2 between the register roller 30 and the fixing device 31 to eliminate the bending of the color erasing sheet P2.

Therefore, in a case where the environmental humidity of the MFP 10 is high, even though the color erasing sheet P2 is heated in the fixing device 31 at the color erasing temperature, the occurrence of paper wrinkles on the color erasing sheet P2 is prevented, thereby a good-quality reusable sheet can be obtained.

According to the second embodiment, the same with the first embodiment, when the MFP 10 is in the printing mode, the vibration of the printing sheet P1 due to the bouncing of the printing sheet P1 when the rear end of the printing sheet P1 passes through the register roller 30 is prevented, thereby a good-quality toner image without image blur can be obtained.

When the MFP 10 is in the color erasing mode, and if the environmental humidity does not exceed the certain value, the speed ratio of the conveyance speed of the color erasing sheet P2 by the register roller 30 to the traveling speed of the color erasing sheet P2 by the fixing device 31 is set to (1:1.01). When the MFP 10 is in the color erasing mode, and if the environmental humidity is high and exceeds the certain value, the speed ratio of the conveyance speed of the color erasing sheet P2 by the register roller 30 to the traveling speed of the color erasing sheet P2 by the fixing device 31 is set to (1:1.02). High tension is applied to the color erasing sheet P2 to prevent the occurrence of paper wrinkles on the color erasing sheet P2, thereby a good-quality reusable sheet without paper wrinkles can be obtained.

(A Third Embodiment)

Figure 6:
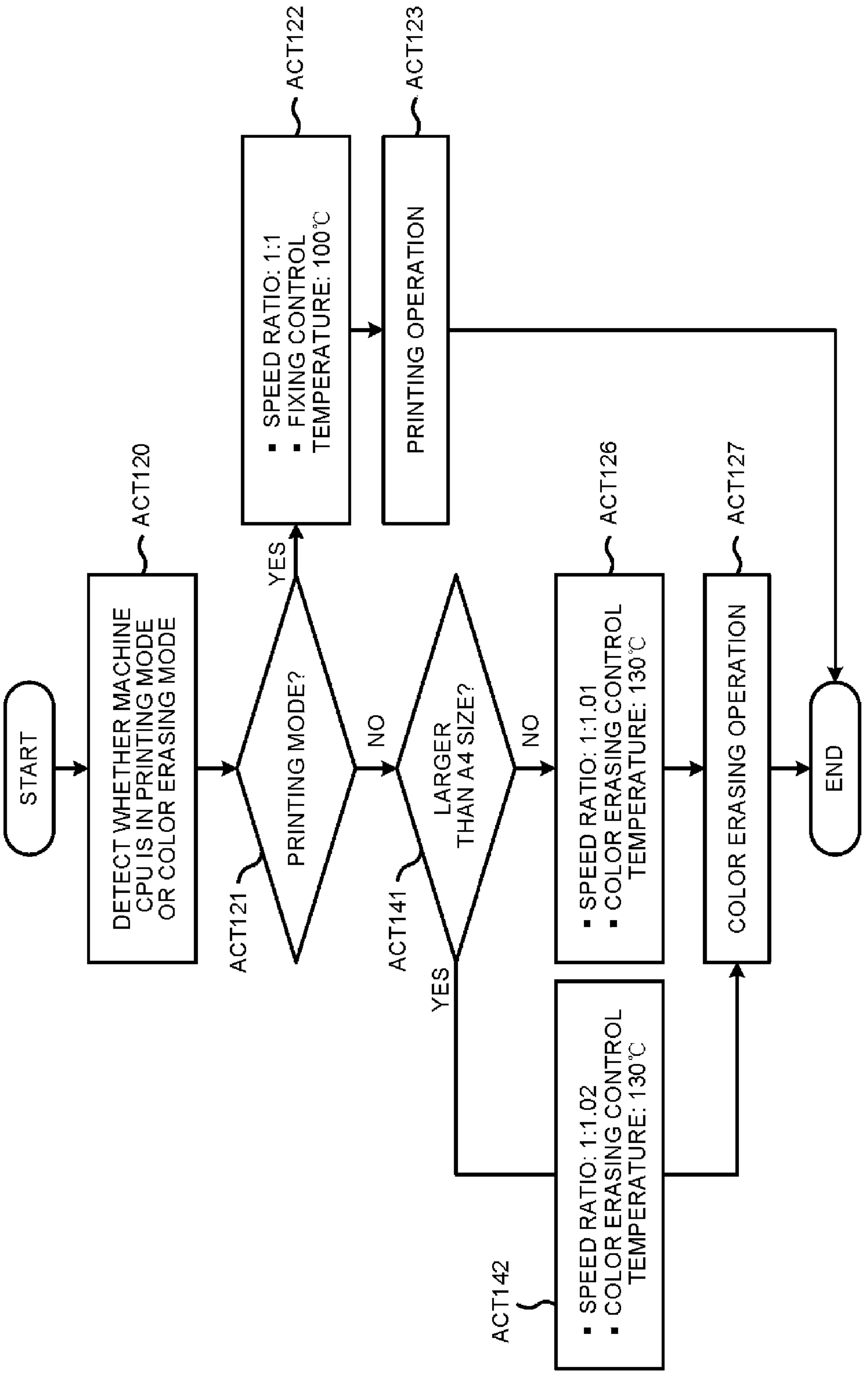
FIG. 6 is a flowchart illustrating a speed control of a sheet according to a third embodiment.

The image forming apparatus according to the third embodiment is described with reference to FIG. 6. The third embodiment controls the speed ratio of the conveyance speed of the conveyance section to the traveling speed of the fixing section in response to the size of the printing recording medium or the color erasing recording medium in the first embodiment. In the third embodiment, a component the same as that described in the first embodiment is marked with the same sign, and the detailed description thereof is omitted.

When the operation mode of the MFP 10 is the color erasing mode, the CPU 100, further using the detection result of the size sensor 71, controls the speed ratio of the conveyance speed of the color erasing sheet P2 by the register roller 30 to the traveling speed of the color erasing sheet 22 by the fixing device 31. If the size of the printing sheet P1 or the color erasing sheet P2 is large, the sheet P1, P2 bends easily. The longer the sheet P1, P2 is, the more easily the paper wrinkles due to the bending of the sheet P1, P2 occur.

The speed control of the sheet P1, P2 of the MFP 10 for preventing the occurrence of paper wrinkles even though in a case where the size of the sheet is large and obtaining a good-quality image without transfer blur is described with reference to the flowchart in FIG. 6.

If the operation mode of the MFP 10 is the printing mode after the MFP 10 is started, the CPU 100 carries out the same processing from ACT 120 to ACT 123 as in the first embodiment. If the operation mode of the MFP 10 is the printing mode, the CPU 100 sets the speed ratio of the conveyance speed of the printing sheet P1 by the register roller 30 to the traveling speed of the printing sheet P1 by the fixing device 31 to (1:1), and then carries out printing operation (ACT 123). The image blur due to the vibration of the printing sheet P1 during the printing mode is prevented, and a good-quality toner image is obtained.

If it is determined that the operation mode of the MFP 10 is the color erasing mode after the MFP 10 is started (NO in ACT 121), the CPU 100 proceeds to ACT 141. In ACT 141, if the size of the color erasing sheet P2 is not larger than the A4 size of a JIS standard according to the detection result of the size sensor 71 (NO in ACT 141), the CPU 100 carries out the same processing from ACT 126 to ACT 127 as in the first embodiment. The CPU 100 controls the speed ratio of the conveyance speed of the color erasing sheet P2 by the register roller 30 to the traveling speed of the color erasing sheet P2 by the fixing device 31 to (1:1.01), and then carries out color erasing operation (ACT 127).

If the size of the color erasing sheet P2 is larger than the A4 size of the JIS standard according to the detection result of the size sensor 71 (YES in ACT 141), the CPU 100 proceeds to ACT 142. In ACT 142, the CPU 100 controls the fixing device driving control circuit 110, and sets the heating temperature of the heater lamp 33*b* to the color erasing temperature. Further, the CPU 100 controls the register roller motor driving control circuit 108 to drive the register roller motor 30*a*. The CPU 100 controls the fixing device driving control circuit 110 to drive the heat roller motor 37.

That is, the CPU 100 drives and controls the register roller motor 30*a* and the heat roller motor 37 such that the traveling speed of the color erasing sheet P2 by the fixing device 31 is, for example, 2% faster than the conveyance speed of the color erasing sheet P2 by the register roller 30. The CPU 100 sets the speed ratio of the conveyance speed of the color erasing sheet P2 by the register roller 30 to the traveling speed of the color erasing sheet P2 by the fixing device 31 to (1:1.02), and then proceeds to ACT 127.

In ACT 127, the CPU 100 conveys the color erasing sheet P2 on which an image is formed with a color erasable toner to the fixing device 31 using the register roller 30. The MFP 10 conveys the color erasing sheet P2 by clamping the color erasing sheet P2 in the nip 36 of the fixing device 31 of which the traveling speed is set to be 2% faster than the conveyance speed of the register roller 30. The fixing device 31 heats the color erasing sheet P2 at the color erasing temperature to erase the toner image on the color erasing sheet P2. The MFP 10 discharges, after the color erasing processing is completed, the color erasing sheet P2 to the paper exit section 22, and then ends the color erasing operation.

In the color erasing mode, if the size of the color erasing sheet P2 is larger than the A4 size, the speed ratio of the conveyance speed of the color erasing sheet P2 by the register roller 30 to the traveling speed of the color erasing sheet P2 by the fixing device 31 is set to (1:1.02), and the color erasing sheet P2 is slightly stretched. High tension is applied to the color erasing sheet P2 between the register roller 30 and the fixing device 31 to eliminate the bending of the color erasing sheet P2. Therefore, in a case where the size of the color erasing sheet P2 is large, even though the color erasing sheet P2 is heated in the fixing device 31 at the color erasing temperature, the occurrence of paper wrinkles on the color erasing sheet P2 is prevented, thereby a good-quality reusable sheet can be obtained.

According to the third embodiment, the same with the first embodiment, when the MFP 10 is in the printing mode, the vibration of the printing sheet P1 due to the bouncing of the printing sheet P1 when the rear end of the printing sheet P1 passes through the register roller 30 is prevented, thereby a good-quality toner image without image blur can be obtained.

When the MFP 10 is in the color erasing mode, and if the size of the color erasing sheet P2 is not larger than the A4 size, the speed ratio of the conveyance speed of the color erasing sheet P2 by the register roller 30 to the traveling speed of the color erasing sheet P2 by the fixing device 31 is set to (1:1.01). If the size of the color erasing sheet P2 is larger than the A4 size, the speed ratio of the conveyance speed of the color erasing sheet P2 by the register roller 30 to the traveling speed of the color erasing sheet P2 by the fixing device 31 is set to (1:1.02). High tension is applied to the color erasing sheet P2 to prevent the occurrence of paper wrinkles on the color erasing sheet P2, thereby a good-quality reusable sheet without paper wrinkles can be obtained.

In the embodiments described above, the speed ratio of the conveyance speed of the conveyance section to the traveling speed of the fixing section is set to 1:1 in the printing mode. However, the speed ratio of the conveyance speed of the conveyance section to the traveling speed of the fixing section can be controlled even in the printing mode as long as the speed ratio of both speeds is in a range where the image blur due to the vibration of the printing recording medium won't occur. The traveling speed of the fixing section may be set a little faster than the conveyance speed of the conveyance section as long as the speed ratio of both speeds is in a range where the image blur won't occur in the printing mode. In addition, in the color erasing mode, the speed ratio of the conveyance speed of the conveyance section to the traveling speed of the fixing section is not limited either. Further, the fixing temperature or the color erasing temperature is not limited.

In accordance with at least one embodiment described above, the speed ratio of the conveyance speed of the conveyance section to the traveling speed of the fixing section is controlled according to the setting temperature of the fixing section. When the image forming apparatus is in the printing mode, a good-quality toner image without image blur on the printing recording medium can be obtained. When the image forming apparatus is in the color erasing mode, the occurrence of paper wrinkles on the color erasing recording medium can be prevented, thereby obtaining a good-quality reusable sheet without paper wrinkles.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:

an image forming section configured to form a toner image on a printing recording medium;

a fixing section configured to heat the printing recording medium printed with the toner image at a fixing temperature or to heat a color erasing recording medium at a temperature above a color erasing temperature;

a temperature control section configured to control the fixing section to the temperature above the color erasing temperature;

a conveyance section configured to convey the printing recording medium or the color erasing recording medium to the fixing section; and a speed control section configured to control, according to a setting temperature of the fixing section, a speed ratio of a traveling speed of the fixing section to a conveyance speed of the conveyance section, wherein the speed ratio when heating the printing recording medium is different than when heating the color erasing recording medium, wherein when heating the color erasing recording medium the speed ratio is controlled so as to create tension in the color erasing recording medium between the fixing section and the conveyance section.

2. The image forming apparatus according to claim 1, wherein a speed difference between the traveling speed and the conveyance speed during fixing operation when the fixing section is at the fixing temperature is smaller than a speed difference between the traveling speed and the conveyance speed during color erasing operation when the fixing section is at the temperature above the color erasing temperature.

3. The image forming apparatus according to claim 1, wherein the traveling speed of the fixing section is faster than the conveyance speed of the conveyance section.

4. the image forming apparatus according to claim 1, further comprising:

an environment sensor configured to detect environment conditions of the printing recording medium or the color erasing recording medium; wherein the speed control section controls the speed ratio in response to a detection result of the environment sensor.

5. The image forming apparatus according to claim 1, further comprising:

a size sensor configured to detect the size of the printing recording medium or the color erasing recording medium; wherein the speed control section controls the speed ratio is response to a detection result of the size sensor.

6. The image forming apparatus according to claim 1, wherein when heating the printing recording medium the speed ratio is controlled so as to not create tension in the printing recording medium between the fixing section and the conveyance section.

* * * * *